Patented Mar. 4, 1952

2,587,904

UNITED STATES PATENT OFFICE 2,587,904

ESTERIFICATION OF MONOHYDRIC ETHER ALCOHOLS

Cornelius John Ryan, Tottenville, N. Y., assignor to E. I. du Pont de Nemours & Company, Wilmington, Del., a corporation of Delaware No Drawing. Application October 27, 1949, Serial No. 123,979

14 Claims. (Cl. 260—485)

This invention relates to improvement in the catalytic esterification of monohydric ether alcohols with organic acids and more particularly it relates to improvements in the catalytic esterification of alkoxyethanols with polycarboxylic acids for the production of substantially water-white ester plasticizers.

It is well known that organic esters are generally prepared by introduction of a mixture of alcohol and organic acid into a fractionating still containing the reactants in either equimolecular proportions or in unequal proportions with one of the reactants in substantially excess to preferentially direct the esterification and containing a small amount of mineral acid as esterification catalyst. Sulfuric acid is generally the preferred catalyst for esterification. The contents of the still are generally maintained at the boiling point of the mixture and as esterification proceeds, an azeotropic mixture comprising reaction water, ester and a water carrier ascends the fractionating column providing a means of water removal and the ester is subsequently recovered and purified. The reactants are charged either continuously into the still in a regulated manner or intermittently in the manufacture of the relatively low boiling esters, but the higher boiling esters generally are prepared by batch-wise operations.

The reactants of commercial quality frequently contain impurities which cause the ester to be of high color. The resulting color bodies present after esterification must be removed by refining and purification steps to render the ester acceptable as a softener or plasticizer in plastics and other products where optimum color quality is pertinent. Monohydric ether alcohols, such as the monobutyl ether of ethylene glycol, that is butoxyethanol, often have a small but significant peroxide content and the high color associated with the orthodox esterification of alkoxyethanols is attributed to the peroxide content. The sulfuric acid catalyst apparently promotes the formation of color bodies in the peroxide-containing reactants and furthermore, the carbonization activity of the sulfuric acid on the esterifiable organic acids is significant in its contribution to color of the products. Consequently, sulfuric acid is not considered an entirely satisfactory esterification catalyst for this type of ester plasticizer, particularly the bis butoxyethyl esters of medium molecular weight dicarboxylic acids, such as adipic.

On the other hand when the acids of phosphorous, such as ortho phosphoric acid, phosphorous acid and hypophosphorous acid, are used as a catalyst, less color from the peroxides is obtained, but in comparison with sulfuric acid as a catalyst, the rate of esterification is much slower and consequently it is often considered impractical to use the acids of phosphorous extensively as a catalyst in commercial esterification operations.

Another means of improving the color of esters is to incorporate nascent hydrogen as a chemical reducing agent in the reaction mixture. U. S. Patent 1,949,267 claims the use of an active metal such as iron, zinc and tin in the presence of a mineral acid in the process of esterifying an aliphatic monohydroxy alcohol with an aliphatic monocarboxylic acid. When the mineral acid is sulfuric acid, the catalytic mixture of acid and active metal does not adequately prevent formation of color bodies in the presence of peroxides.

It is an object of this invention to provide a practical process for the manufacture of high quality, very low color ester plasticizers of monohydric ether alcohols and polycarboxylic acids. Another object is to provide a process for manufacture of ester plasticizers substantially free of peroxide color bodies. A further object is to provide a process of esterification involving an improved rate of esterification. A still further object is to provide an improved process of esterifying peroxide-containing alkoxy ethanols with carboxylic acids to form water-white ester plasticizers.

These objects are accomplished in accordance with the present invention by carrying out the esterification of the mixture of esterifiable reactants containing reducible color forming bodies in the presence of a catalyst consisting of a mixture of ferrous sulfate and an acid of phosphorous of the group consisting of orthophosphoric, phosphorous and hypophosphorous, said esterification being preferably carried out at a temperature in the range of about 130 to 150° C.

The following is a general example of carrying out the invention. The alcohol and the polycarboxylic acid are initially premixed in the presence of a water carrier in a dissolving tank and heated to facilitate solution of the reactants. The dissolving tank is agitated continuously for at least an hour until the polycarboxylic acid, which is usually a solid, is dissolved. The still-pot is initially charged with the catalyst consisting of about one part of an acid of phosphorous of the group orthophosphoric, phosphorus and hypophosphorous and one part of ferrous sulfate with a small proportion of water to dissolve the salt. The catalyst is used on the basis of 1% of the esterifiable reactants. The hot solution of reactants is then transferred from the dissolving tank to the still-pot and any additional water carrier is then added. The still-charge is heated to a temperature of about 125° C. and refluxed for ½ hour at total reflux without distillation of the mixture of water and water carrier. Refluxing is continued at a temperature in the range of 130 to 140° C. with the water being removed by means of the water carrier to a separator from which the recovered carrier is returned to the still. The esterification is followed by analysis of the change in acidity of the still charge. Refluxing and water take-off is stopped after the acidity of the charge is such that 6 cc. of 0.1 N. caustic is required to neutralize 5 cc. of still-charge. The crude ester is cooled to a temperature of 65° C. or lower by pumping it through an ester condenser and finally is transferred to a storage tank from whence it is neutralized and refined.

In the absence of a dissolving tank, the reactants and the water carrier may be charged directly into the still and refluxed totally for about two hours at about 125° C. before the catalyst mixture is added. Then the process is carried on as before with refluxing and separation of the water until the desired acidity is reached.

The neutralized, refined ester is very low in color. When tested by the published color standards of the American Public Health Association as described in Standard Methods for Examination of Water and Sewage, page 14, 9th edition, 1946, published by the American Public Health Association, it has a value of about 10 A. P. H. A., although the ether modified monohydric alcohol contained potentially color-forming peroxides. Esterification similarly carried out using sulfuric acid in place of the acid of phosphorous-ferrous sulfate catalyst yielded a product significantly colored by comparison, having an A. P. H. A. color of 100 and higher. For the purpose of this invention, very low color is intended to mean color equivalent of A. P. H. A.—20 and lower.

The fast rate of esterification or short esterification cycle associated with the use of sulfuric acid directs preference to this catalytic agent when the product is not subject to optimum color specifications. Obviously this esterification cycle serves as a reference standard in the selection of catalysts which render an improvement, such as in this instance, improvement in color quality.

Although the above mentioned acids of phosphorous yield improved color quality, the rate of esterification is significantly slower in comparison with sulfuric acid and consequently the cycle is several times longer. A catalyst consisting of equal parts of an acid of phosphorous and ferrous sulfate, however, was advantageously found to yield even better quality results at a shortened cycle in comparison with the acid of phosphorous used as the sole catalyst, the cycle more closely approaching that associated with the use of sulfuric acid.

In a typical comparison of esterification cycles involving the use of the aforementioned catalysts in the preparation of bis(butoxy-ethyl) adipate, the following cycles were observed.

TABLE I

| Catalyst | Cycle | Acid Conversion (Ester Content) | A.P.H.A. Color |
|---|---|---|---|
| A. Sulfuric acid | 3 hr. 20 min. | 98.4 | 100 |
| B. Orthophosphoric Acid | 10 hours | 97.5 | 40 |
| C. Phosphoric Acid Ferrous Sulfate | 4 hr. 30 min. | 99.3 | 15 |
| D. Phosphorous Acid | 11 hours | 98.2 | 30 |
| E. Phosphorous Acid Ferrous Sulfate | 5 hours | 99.3 | 15 |
| F. Hypophosphorous | 11 hours | 98.0 | 10 |
| G. Hypophosphorous Ferrous Sulfate | 6 hours | 98.0 | 10 |

These results show that the cycles for the mixed catalysts used in this invention are about one-half that observed for the acid of phosphorous used in the absence of ferrous sulfate and about 50% to 80% longer than that observed for sulfuric acid.

The following example more particularly describes the esterification process as applied to the manufacture of bis (butoxyethyl) adipate.

*Example 1*

A. Dissolving tank charge:   Parts by weight
   Butoxyethanol _____ 6838
   Toluene (water carrier) _____ 1441
   Adipic acid _____ 4000

The butoxyethanol and the toluene were charged in the order indicated and the mixture was heated at 90° C. Agitation was commenced and the adipic acid was added with the temperature of the tank charge maintained in the range of 90 to 95° C. Agitation was continued for at least one hour after the addition of the adipic acid. The quantity of alcohol charged was in slight excess over the theoretical equivalent necessary to esterify the organic acid. In this instance the excess was about 5.7%.

B. Still charge:   Parts by weight
   Water _____ 25
   Ortho phosphoric acid (Comm. 85%) ___ 54
   Ferrous sulfate _____ 54

The catalyst mixture was charged first and then the hot solution of adipic acid was transferred from the dissolving tank to the still.

A second portion of water carrier (toluene) consisting of 2844 parts was charged into the dissolving tank to flush any residue of the adipic acid solution into the still. The still charge was heated and refluxed for about one-half hour at 120 to 130° C. after which time refluxing was continued as the still temperature was permitted to increase to the range of 135 to 140° C. by control of the take-off and return of the water carrier. Water withdrawal was continued until the desired acidity of the still charge was reached. A representative control was that water draw-off ceased after an acidity equivalent to 6 cc. of 0.1 N caustic for a 5 cc. sample was reached and two samples taken one hour apart showed acidity decrease of 1 cc. and less of 0.1 N caustic.

At this desired degree of esterification the still charge was cooled by pumping it through an ester condenser and transferred to a storage tank for the unneutralized ester where it was kept at a temperature of 65° C. or lower to prevent acidity build-up.

The refining of the crude ester was carried out in an orthodox manner described as follows:

If the crude ester was not neutralized immediately, the acidity of the crude in storage was ascertained just prior to neutralization with dilute caustic. The amount of dilute caustic required was calculated on the basis of about 15% excess of the amount necessary for neutrality to phenol-phthalein. This aqueous caustic solution preferably contained about 3% sodium hydroxide, but concentrations in the range of 2 to 4.5% have been found acceptable. Use of higher concentrations of caustic caused some saponification and use of lower concentrations increased the volume of water in contact with the crude ester and consequently decreased the yield through loss of water soluble material. In practice, the volume of dilute caustic was about one-third to one-half that of the unneutralized crude ester including the water carrier, but it may be varied at will. The dilute caustic and crude ester were fed simultaneously at proportionate rates into a neutralizing pump and discharged into a non-agitated storage tank where the water phase was allowed to separate from the neutralized crude. Samples were periodically checked to ascertain neutrality in reference to phenol-phthalein indicator. The rate of feed of the caustic was increased in proportion to the rate of the crude ester if the aforementioned neutrality had not been reached. The water phase containing salts and other water soluble impurities was separated by decantation and transferred to storage for subsequent processing to recover valuable soluble materials.

The neutralized crude was washed with fresh water by charging about 3 volumes of water for each 16 volumes of neutralized ester and circulating the water from the bottom to the top of the still for about one-half hour. The water was allowed to separate for about one-half hour and withdrawn. A decolorizing carbon such as Nuchar was charged into the still in the proportion of about 65 pounds for a 1000 gallon vacuum still charge. Vacuum was applied and the charge was slowly increased in temperature to 100° C. to distill the water carrier which was subsequently withdrawn from the vacuum receiver. After removal of the water carrier, the ester was steamed under vacuum for three hours at a temperature of 130° C. using live steam. The product then meeting quality specifications particularly in reference to color and odor was cooled to 90° C. and lower and press filtered to remove the decolorizing agent. The refined product conformed to the following pertinent specifications.

Color, 20 maximum A. P. H. A.
Acidity, .02% maximum calculated as adipic acid.
Ester content, 99.0 to 102.5% calculated as bis-(butoxyethyl) adipate.
Specific gravity, .9956–1.0056 at 25/25° C.

It is obvious that other orthodox refining operations associated with the purification of high boiling esters may be used in the treatment of the crude ester obtained by esterification using ferrous sulfate and an acid of phosphorous as the mixed catalyst.

Another modification consists in charging the adsorbent media—usually activated carbons and clays—directly into the refining still, and in passing the steamed ester through a column or filter bed of the said adsorbents.

Equivalent results were obtained when phosphorous acid and hypophosphorous acid were substituted for the orthophosphoric acid.

In contrast to the use of activated adsorbents only in the final stages, it has been found effective to have mixed adsorbents present also in the still charge during esterification. U. S. Patent 2,320,844 relates to a process of preparing organic acid esters by esterification in the presence of activated carbon. The following example shows this alternate esterification operation which is equally preferred using a mixture of acid activated clay and activated vegetable carbon.

Example 2

The charge was identical with that of Example 1 except that after the second portion of toluene was transferred from the dissolving tank to the still 60 parts of (Nuchar C-145) neutral activated vegetable carbon and 20 parts of (Special Filtrol) acid activated montmorillonite clay were added directly to the still before refluxing commenced. Although either adsorbent activated carbon or activated clay may be used alone in the esterification stage, the decolorizing carbon was found to be advantageously supplemented to an unanticipated degree by the activated montmorillonite clay, such as Special Filtrol which functions as a filter aid in subsequent separation of the decolorizing agent and apparently acts cooperatively with the activated adsorptive carbon to produce lower color results than are obtained with either adsorbent used alone in the esterification stage. This unanticipated cooperative activity was detectable when 100 parts of the mixture of activated adsorbents contained from 20 to 50 parts of activated clay.

The raw alkoxy monohydric alcohol containing peroxides may be pretreated with ferrous sulfate prior to the addition of the acid of phosphorous esterification catalyst. However, there are no quality advantages gained by incorporation of this additional pretreatment step over the use of ferrous sulfate in the esterification stage.

Butoxy ethanol has been found to vary in peroxide content and material supplied commercially on analysis has been found to contain 0.4 to 10.0 parts per million and more of peroxide calculated as hydrogen peroxide. This alcohol stored in partially filled tanks in contact with air has been found to increase in peroxide content to about 50 parts per million in a short time. A blanket of inert gas, such as nitrogen, retards such increase of peroxide content during storage. The following tabulation shows the relationship between the color of the refined ester and the peroxide content of the ester forming alcohol, butoxyethanol.

TABLE II

| Alcohol Sample | Peroxide Content, Parts per Million | APHA Color of Refined Ester | |
|---|---|---|---|
| | | FeSO$_4$–H$_3$PO$_4$ Catalyst | H$_3$PO$_4$ Catalyst |
| 1 | 0.4 | 10 | 20 |
| 2 | 1.74 | 10 | 20 |
| 3 | 3.74 | 15 | |
| 4 | 6.4 | 15 | 50 |
| 5 | 10.0 | 20 | 50 |
| 6 | 24.6 | 20 | |
| 7 | 38.0 | 20+ | |
| 8 | 45.0 | 45 | |
| 9 | 56.0 | 35+ | |

The mixed catalyst consisting of equal parts of ferrous sulfate and orthophosphoric acid was used at a concentration of 1% based on the esterifiable reactants. When the mixed catalyst consisting of two parts of ferrous sulfate and one part of phosphoric acid, thereby increasing the reducing activity of the catalyst, was used on the basis of 1.5%, Sample 8 having a peroxide content of 45 P. P. M. yielded a refined ester characterized by a color of 20 A. P. H. A. Similarly, Samples 6 and 7 yielded refined esters each having a color of 15—A. P. H. A.

The mixed catalyst of hypophosphorous acid and ferrous sulfate is further unique inasmuch as both components exhibit reducing activity. The greater activity of this catalyst over that of the mixed catalysts involving orthophosphoric and phosphorous acids is demonstrated by the fact that Alcohol Sample 9 esterified using 1% hypophosphorous acid-ferrous sulfate catalyst in accordance with the method described in Example 1 yielded a refined ester having a color of 15 A. P. H. A. in comparison with 35 A. P. H. A. reported above for the orthophosphoric acid ferrous sulfate catalyst used at the same concentration. The use of the mixed catalyst containing the hypophosphorous acid provides a means of obtaining highest color quality esters from alkoxyethanols containing a peroxide content higher than that which will normally yield water white esters with the mixed catalyst based on orthophosphoric acid or phosphorous acid in combination with ferrous sulfate.

These mixed reducing catalysts yield similar results in the esterification of other aliphatic dicarboxylic acids of 6 to 10 carbon atoms with monohydric ether alcohols, such esters being described in U. S. Patent 1,991,391.

The aromatic carboxylic acids generally exhibit slower rates of esterification in comparison with the aliphatic acids, but the use of the mixed reducing catalysts of this invention with aromatic carboxylic acids such as phthalic results in significantly reduced esterification cycles in comparison with the acids of phosphorous used as the sole catalyst. Equivalently good results may be obtained with such aromatic acids as isophthalic, hexahydroterephthalic, p-tertiary butyl benzoic, toluic and naphthoic. The long chain fatty acids such as stearic may also be esterified with monohydric ether alcohols advantageously using the mixed catalysts of this invention to produce ester plasticizers of excellent color quality. Inasmuch as the use of the catalyst of this invention is pertinent to esterification in the presence of potentially color-forming peroxides, the catalyst is useful in esterifying alkoxy-monohydric alcohols in general such as methoxyethanol, ethoxyethanol, butoxyethanol, 2-ethylhexoxyethanol, methoxyethoxyethanol, ethoxyethoxyethanol and butoxyethoxyethanol. Phenoxyethanol may also be satisfactorily esterified to an exceptionally low-color plasticizer. The esterification process of this invention is also useful in the esterification of the aliphatic monohydric alcohols which contain reducible color forming impurities. For example, an inferior grade of butyl alcohol was esterified with phthalic anhydride using sulfuric acid catalyst and processed to a refined ester having a color of 45 A. P. H. A. The same ester prepared using the ferrous sulfate-phosphoric acid catalyst had a color of 10 A. P. H. A. Although the desired excellent color quality was obtained, the esterification cycle was about 8 hours compared with about 4 hours for the sulfuric acid catalyst and the cycle was not significantly shortened in comparison with phosphoric acid.

It was found that the use of the ferrous sulfate-acid of phosphorous mixed catalyst resulted in significantly improved esterification cycles in reference to acid catalyst used alone for esterification reactions carried out at a temperature in the preferred range of 130° C. to 150° C. The catalytic process is not limited to this preferred range as successful accelerated esterification was carried out in the range of 125 to 165° C. In the esterification of the low boiling alcohols and low boiling carboxylic acid, where temperature of the still charge does not reach the apparent threshhold temperature of about 130° C., there is not an opportunity to take advantage of the potential accelerated rate of esterification involving the mixed reducing catalysts.

Although a preferred mixed catalyst content of 1% was shown in the examples, the content may be varied from 0.3 to 3.0% based on the charge of reactants as is customary in the art. The mixed catalyst composition was indicated as equal parts of ferrous sulfate and an acid of phosphorous of the group orthophosphoric, phosphorous and hypophosphorous, but the ratio may be varied substantially. The preferred content of ferrous sulfate is about 0.3 to 1.0% based on the reactants charged into the still. Higher concentrations of this component give rise to the problem of adequately removing iron salts during the refining stage.

The demand for higher quality ester plasticizers for use in plastics is emphasized by the establishment of specifications requiring a color limitation of 20 A. P. H. A. and lower. Impurities present in commercial quality alcohols, particularly ether modified monohydric alcohols, yield color forming substances during esterifications and orthodox refining methods are inadequate to remove the color bodies to conform with the ester specifications. Specific lots of alcohol either free of color forming impurities or sufficiently low in content thereof might be selected to permit conformance to the ester specifications by the ester prepared therefrom. However, esterification of even selected lots of better quality alcohol using sulfuric acid catalyst rarely produces esters meeting these specifications for very low color. Another expedient is to use an acid of phosphorous as the sole catalyst with selected lots of alcohol. The long esterification cycles with such a catalyst makes its use unattractive because of the reduced output on the basis of capacity and because of quality segregation of the alcohol in respect to peroxide content required to consistently meet the specifications is impractical. Consequently, a distinct advancement in the art of esterification has been made in the use of a mixed catalyst consisting of ferrous sulfate and an acid of phosphorous of the said group the ferrous sulfate accelerating the activity of the acid of phosphorous to shorten the esterification cycle and to serve as an agent for reducing potential color-forming bodies present in the esterifiable reactants, particularly peroxides present in ether modified monohydric alcohols such as alkoxyethanols. The use of these mixed reducing catalysts provided a means of manufacturing low color ester plasticizers from commercially available monohydric ether modified alcohols containing as much as 50 parts per million of peroxides, calculated as hydrogen peroxide, or equivalent potentially color forming impurities. The use of the mixed reducing catalysts does not involve undue sacrifice in the rate of esterification to accomplish the desired quality of the product. This is particularly the case, if the esterification is carried out at a temperature of 130° C. and higher. At these temperatures, esterification cycles using the mixed reducing catalysts are about 40–80% longer than the cycles using sulfuric acid catalyst in contrast with several fold longer for an acid of phosphorous in comparison with sulfuric acid.

It will be apparent that many changes in method and materials can be made without departing from the scope of the invention. Consequently, it is to be understood that this invention is not in any way limited to the compositions and procedures specifically set forth as limited by the appended claims.

I claim:

1. In the process of preparing esters from alkoxy-alkanols and an esterifiable polycarboxylic acid to produce an ester which is normally discolored, the improvement which comprises reducing the discoloration by refluxing the said esterifiable polycarboxylic acid and the alkoxy-alkanol in the presence of an acid of phosphorous and ferrous sulfate.

2. The process of claim 1 in which the acid of phosphorous is orthophosphoric acid.

3. The process of claim 1 in which the acid of phosphorous is phosphorous acid.

4. The process of claim 1 in which the acid of phosphorous is hypophosphorous acid.

5. The process of claim 1 in which the esterification is carried out within the range of 125–165° C.

6. The process of claim 1 in which the esterification is carried out within the range of 130–150° C.

7. The process of claim 1 in which the acid of phosphorous and the ferrous sulfate is present in the amount of about 1% based on the esterifiable reactants.

8. The process of claim 1 in which the ratio of acid of phosphorous to ferrous sulfate is about 1:1.

9. The process of claim 1 in which the ferrous sulfate is present in amount between 0.3 and 1.0% based on the esterifiable reactants.

10. The process of claim 1 in which the combined ferrous sulfate and acid of phosphorous is between 0.3 and 3.0% based on the charge of reactants.

11. The process of claim 1 in which the combined ferrous sulfate and acid of phosphorous is between 0.3 and 3.0% and the ferrous sulfate is present in amount between 0.3 and 1.0% based on the esterifiable reactants.

12. The process of claim 1 in which the alcohol is a monohydric ether alcohol.

13. The process of claim 1 in which the alcohol is a liquid boiling above 130° C.

14. The process of preparing esters from adipic acid and butoxyethanol which contains small amounts of a color producing peroxide which comprises mixing about 6,838 parts of butoxyethanol with about 1,441 parts of toluene, heating the same to from 90° C. to 95° C., adding about 4,000 parts of adipic acid to the mixture, continuing the heating and adding to the mixture 54 parts of an acid of phosphorus and 54 parts of ferrous sulfate, adding more toluene thereto and refluxing the mixture until the temperature increases to from 135° C. to 140° C., and thereafter separating and purifying the ester so formed.

CORNELIUS JOHN RYAN.

No references cited.